May 21, 1940.  H. I. WILLIAMS  2,201,511
CAMERA BACK
Filed Dec. 5, 1938
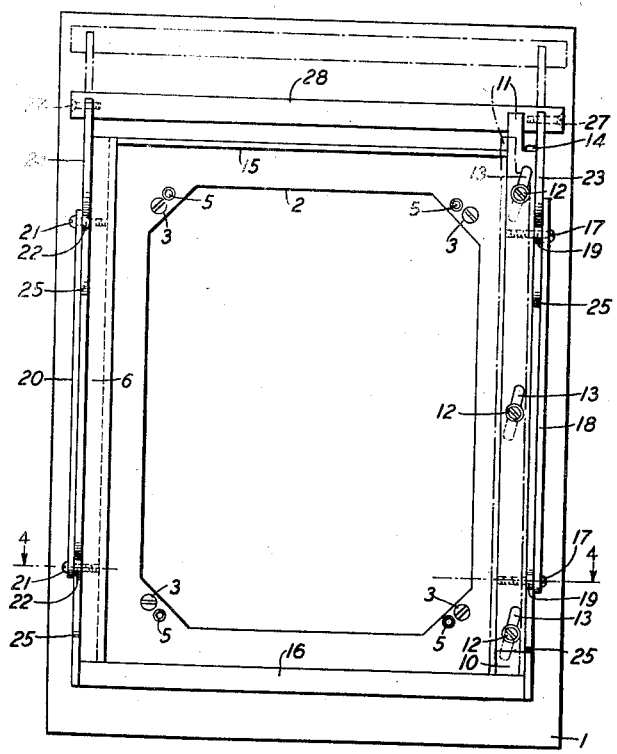
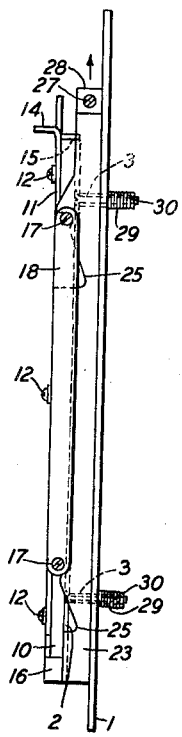
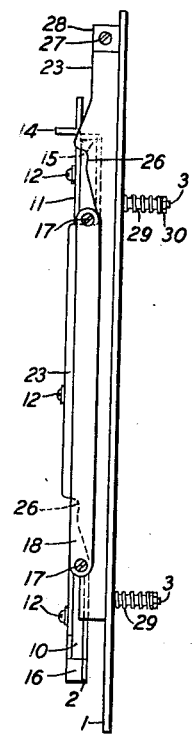
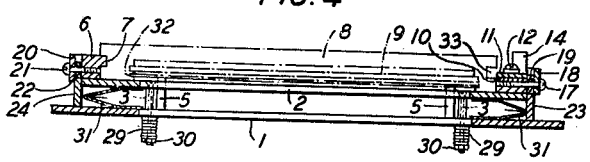
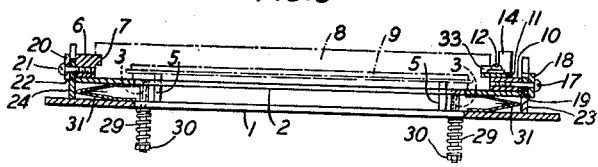
INVENTOR
BY H. I. WILLIAMS
Stoddard
ATTORNEY Patented May 21, 1940

2,201,511

UNITED STATES PATENT OFFICE 2,201,511

CAMERA BACK

Harney I. Williams, Baldwin, N. Y.

Application December 5, 1938, Serial No. 243,952

7 Claims. (Cl. 95—72)

This invention relates to an improved back for cameras and, more particularly, to a device for causing a plate, or other photo-sensitive material, inserted in a camera to be held exactly in focus upon the withdrawal of the plate cover slide and the operation of a camming device.

Heretofore, in preparation for taking one or more pictures in certain types of cameras, it has been the practice to insert glass plates, films, or other photo-sensitized material, in plate, or film, holders and then insert one such holder in the camera back, the film, or plate, resting on the borders of the holder and the holder resting against the camera back. Although it is desirable that the plate, or film, be held in the exact plane of focus of the camera lens, it frequently happens that the photo-sensitized material is held either partly or entirely out of the plane of exact focus due to inequalities in the manufacture of the holders. Frequently, the holders become warped by usage or temperature changes. Although the resulting departure from true focus may be only slight, it is a material factor in determining the quality of the resulting photograph, especially in the field of color photography which, as is well known in the art, requires exact focusing of the several plates, or films, used to make each color photograph.

Accordingly, it is an object of this invention to provide a camera back with a device for causing the plate, or film, to be held in exact focus when the plate cover slide has been withdrawn and a camming device has been operated.

Another object of the invention is to provide a camera back with a camming device for moving a plate from a position out of focus into a position of exact focus after the plate cover slide has been withdrawn.

Still another object of the invention is to prevent the light-sealing slide from being either withdrawn or inserted after the plate, or film, has been placed in its position of exact focus.

These and other objects of the invention are accomplished by providing a rectangular camera back with a pin, or stud, fixedly mounted in each of its four corners. Secured to the camera back is a two-position frame having a plurality of camming bars for moving it from one position to the other. One of these positions is that in which the frame holds a plate, or film, away from the studs in such a position that the light-sealing slide may be either inserted or removed from between the photo-sensitive member and the studs. The other position is that in which the frame holds a plate against the four focusing pins after the plate cover slide has been withdrawn.

The invention will be described more fully in connection with the following description of the drawing in which:

Fig. 1 is a front view of the improved camera back showing the four focusing pins;

Fig. 2 is a side view of the camera back showing the camming device in its unoperated position in which a plate holder is held out of focus;

Fig. 3 is a side view of the camera back showing the camming device in its operated position in which a plate is held in exact focus;

Fig. 4 is an end view of the camera back showing the frame in its unoperated position; and Fig. 5 is an end view of the camera back showing the frame in its operated position with the plate resting on the focusing pins.

As is shown in Fig. 1, the camera back comprises a frame, or base member, 1 to which a supporting frame 2 is adjustably secured by four bolts 3 in such a manner that frame 2 may be moved into either of two positions as will be more fully explained hereinafter. The space between frames 1 and 2 is completely light-sealed by a bellows 31 securely attached to the inner surfaces of frames 1 and 2 and extending continuously around their four sides. Fixedly attached to the base member 1 are four studs, or pins, 5 which pass through holes in the supporting frame 2 and project slightly above the surface of frame 2 as is shown in Fig. 4. The height of these studs 5 should be carefully determined with a high degree of accuracy so that, when a plate 9 rests on them, they will determine a plane of exact focus for plate 9 regardless of any inaccuracies in the plate holder 8. Secured to the left margin of frame 2 is a holding, or guide, member 6 having a projecting tongue 7 which is adapted to fit into the groove in a plate, or film, holder 8 as is shown in Figs. 4 and 5 in which the dot-dash lines represent a plate holder 8 and a plate 9. It is to be understood that the invention is not limited to the use of photo-sensitive material on glass plates as any form of photo-sensitized material, such as photo-sensitized Celluloid, cut film, roll film, or film pack, may be used.

Mounted along the right margin of frame 2 is a holding, or guide, member 10 having a locking member 11 adjustably secured thereto by three screws 12 which pass through three slots 13 in member 11. One end of locking member 11 is bifurcated and has one fork 14 bent up at right angles to the other fork. This projection 14 serves as a hold whereby the member 11 may be pushed back and forth in the limited path of travel, determined by the screws 12 and the slots 13, for the purpose of locking, or unlocking, a plate 9 and its holder 8 contained within the camera back. With the camera back in the position shown in Fig. 1, pushing the projection 14 up toward the top moves the locking member 11 up and toward the right to unlock the plate 9 and its holder 8 as is shown in Fig. 4. When the projection 14 is pulled down toward the bottom, the locking member 11 is carried down and toward the left thereby locking the plate 9 in its holder 8 as is shown in Fig. 5. Two side guide, or holding, members 15 and 16 are attached to the supporting frame 2 between the members 6 and 10 for the purpose of assisting in holding a plate holder 8 therebetween.

Secured to member 10 by bolts 17—17 is a link 18 spaced from member 10 by washers 19—19. A similar link 20 is secured to member 6 by bolts 21—21 and is spaced apart therefrom by washers 22—22. The washers 19—19 rest on the top edge of a camming bar 23 and the washers 22—22 rest on the top edge of a similar camming bar 24. The camming edge of bar 24 is similar to that of bar 23 which, as can be seen in Figs. 2 and 3, has two points of depression 25—25 and two points of elevation 26—26.

Attached to the upper ends of camming bars 23 and 24 by bolts 27—27 is an operating bar 28 for operating the camming bars 23 and 24. When bar 28 is in the position shown in full lines in Fig. 1, the camming bars 23 and 24 are in the position where the bolts 17—17 and 21—21 are supported at the points of elevation 26—26 of bars 23 and 24 as is indicated in Fig. 2. Bar 28 can then be manually pulled upward to its operated position shown in dotted lines in Fig. 1 thereby moving the camming bars 23 and 24 upward so that bolts 17—17 and 21—21 will now be supported at the points of depression 25—25 on bars 23 and 24 as is represented in Fig. 3.

Bolts 17—17 and 21—21 are compelled to follow the camming surfaces of bars 23 and 24 due to the pull exerted by springs 29 which are coiled around each bolt 3 and held thereon by nuts 30. Consequently, when bar 28 is in the position shown in Fig. 1 and the camming bars 23 and 24 are in the position indicated in Fig. 2, then the plate holder 8 and the photo-sensitive member 9 will be supported in a position out of focus a slight distance above the tops of studs 5, as shown in Fig. 4, ready for a possible substitution by another photo-sensitive member. By pulling bar 28 up to its operated position shown in dotted lines in Fig. 1, the camming bars 23 and 24 will be moved to the position indicated in Fig. 3 with the result that springs 29 will pull frame 2 down. When frame 2 moves down, it carries with it the members 6, 10, 15, and 16 thereby carrying the holder 8 and plate 9 down so that the plate 9 will rest on the tops of the studs 5 in a position of exact focus in spite of any inaccuracies in the holder 8. Plate 9 is securely held in this position under the tension exerted by springs 29.

The operation of this improved camera back is accomplished in the following manner. The operating bar 28 is manually moved to its operated position shown in full lines in Fig. 1 and the projection 14 is manually pushed upward to move the locking member 11 upward and to the left to its unoperated position. A plate holder 8 containing a plate 9 and a light-sealing, or plate cover, slide 32 is then placed within the confines of the holding, or guide, members 6, 10, 15, and 16, the tongue 7 of member 6 engaging with the groove in the plate holder 8. It can be seen in Fig. 4, that the plate holder 8 is, at this time, supported upon the borders of frame 2. The projection 14 is now pulled down thereby moving the locking member 11 to its operated position where it enters the slot 33 in the plate holder 8, as shown in Fig. 5, to lock the plate holder 8, securely in place.

The plate cover slide 32 is now removed and the operating bar 28 pulled upward to its operated position, shown in dotted lines in Fig. 1, thereby moving the camming bars 23 and 24 to their operated positions, as is indicated in Fig. 3. This places the points of depression 25—25 of bars 23 and 24 beneath the bolts 17—17 and 21—21 to permit springs 29 to pull the supporting frame 2 down to the position shown in Fig. 5 where it is firmly held by the force exerted by springs 29. It can be seen in Fig. 5 that, with frame 2 in this position, the plate 9 has been conveyed to its lower position where it rests on the tops of studs 5 and is held there firmly by springs 29 in a plane of exact focus ready for exposure. It should be noted that, when the plate 9 is in this plane of exact focus, the light-sealing slide 32 cannot be inserted into the plate holder 8 nor could it be withdrawn if it had been left in because, since the plate holder 8 has been lowered down near the level of bar 28, bar 28 now projects above the plane of entrance of slide 32 thereby blocking its path of travel.

After exposure of the plate 9, bar 28 is pulled back to its unoperated position, shown in full lines in Fig. 1, thereby moving the camming bars 23 and 24 to their unoperated positions, as is indicated in Fig. 2. This places the points of elevation 26—26 of bars 23 and 24 under bolts 17—17 and 21—21. This lifts frame 2 against the pull exerted by springs 29 thereby lifting plate 9 up off studs 5, as shown in Fig. 4. Slide 32 should now be inserted in holder 8 after which projection 14 is pushed up to release holder 8 by moving member 11 to its unoperated position shown in Fig. 4. Holder 8 and member 9 can now be withdrawn from the confines of members 6, 10, 15, and 16 thus restoring the apparatus to its original condition.

It is to be understood that the apparatus shown in the drawing represents the preferred embodiment of the invention and that the invention is not to be restricted to the particular form shown as various modifications may be made without exceeding the scope of the invention which is to be limited only by the claims appended hereto.

What is claimed is:

1. In combination, a camera back including movable means adapted to carry a holder having a photo-sensitive member, and instrumentalities for determining a plane of exact focus for a photo-sensitive member in a holder carried by said movable means, said instrumentalities comprising a plurality of studs.

2. In combination, a camera back comprising a base member, a supporting member adapted to carry a holder having a photo-sensitive member, means for determining a plane of exact focus for a photo-sensitive member carried by said supporting member, said means including a plurality of studs slidably mounted in the supporting member and fixedly attached to said base member.

3. In combination, a camera back including movable supporting means adapted to carry a photo-sensitive member and a light-sealing slide, said movable supporting means having one position in which a photo-sensitive member carried thereby is held out of focus and having another position in which a photo-sensitive member carried thereby is held in a plane of exact focus, camming means for bearing against the movable supporting means to move it from one position to the other and back again, and operating means for operating said camming means.

4. In combination, a camera back having a movable supporting member adapted to carry a photo-sensitive member, said movable supporting member having one position in which a photo-sensitive member carried thereby is held out of focus and having another position in which a photo-sensitive member carried thereby is held in a plane of exact focus, a camming bar for causing said supporting member to be moved from one position to the other, said camming bar having one edge having thereon a point of depression and a point of elevation, an instrumentality for supporting the supporting member upon the edge of the camming bar, and operating means for moving the camming bar back and forth whereby the supporting member is raised and lowered in accordance with the movement of the camming bar placing first its point of elevation under said instrumentality and then placing its point of depression under said instrumentality.

5. In combination, a camera back having movable supporting means adapted to carry a photo-sensitive member and also adapted to slidably receive a light-sealing slide in such manner that said slide may be withdrawn from said supporting means and then inserted therein for covering said photo-sensitive member, said movable supporting means having a first position in which a photo-sensitive member is held out of focus and in which a slide may be withdrawn from the supporting means and then inserted therein, and having a second position in which a photo-sensitive member is held in a plane of exact focus, actuating means for causing said supporting means to be moved from one position to the other, and an instrumentality for preventing a light-sealing slide from being withdrawn from said supporting means after said actuating means has moved the supporting means to its second position and also for preventing the insertion of a light-sealing slide into the supporting means after said supporting means has been moved to its second position.

6. A camera back comprising a base member, a movable supporting member adapted to carry a photo-sensitive member, and a light-sealing slide, instrumentalities for determining a plane of exact focus for a photo-sensitive member carried by said supporting member, said instrumentalities including a plurality of studs slidably mounted in the supporting member and fixedly attached to the base member, first means for pulling the supporting member toward the base member, and second means for forcing the supporting member away from the base member.

7. A camera back comprising movable supporting means adapted to carry a photo-sensitive member, a plurality of studs for determining a plane of exact focus for a photo-sensitive member carried by said supporting means, instrumentalities for moving the supporting means into a position in which a photo-sensitive member carried thereby will rest upon said studs in a plane of exact focus, and control means for causing said instrumentalities to move the supporting means into a position in which a photo-sensitive member carried thereby will be removed from contact with said studs and will be held in a plane out of focus.

HARNEY I. WILLIAMS.